Aug. 26, 1930.  J. KOZISEK  1,774,332

COMMUTATION IN DYNAMO ELECTRIC MACHINES

Filed Dec. 7, 1928

INVENTOR
Jaroslav Kozisek.
ATTORNEY

Patented Aug. 26, 1930

1,774,332

UNITED STATES PATENT OFFICE

JAROSLAV KOZISEK, OF BERLIN-CHARLOTTENBURG, GERMANY, ASSIGNOR TO WESTINGHOUSE ELECTRIC & MANUFACTURING COMPANY, A CORPORATION OF PENNSYLVANIA

COMMUTATION IN DYNAMO-ELECTRIC MACHINES

Application filed December 7, 1928, Serial No. 324,440, and in Germany October 8, 1927.

Applications have been filed in foreign countries as follows: Germany, October 8, 1927; Sweden, September 29, 1928; Switzerland, September 29, 1928; Czechoslovakia, October 8, 1928.

My invention relates to dynamo-electric machines and, more particularly, to means for insuring equal distribution of currents in the drum-armature windings of either direct-current or alternating-current machines, particularly those of the commutator type.

Commutation of dynamo-electric machines is often impaired because of unequal distribution of current between the different brush arms. The reason for this unequal distribution of current may be attributed to various circumstances. For instance, the contact resistance of the various brushes may differ because of difference in brush pressures, or, even the brushes may be improperly adjusted or aligned. As a result, there are very substantial differences in the magnitudes of the currents which are commutated at the respective brush arms.

It is an object of my invention to provide means for damping the abnormal currents which are carried by some of the armature coils of the drum winding while they are under commutation.

It is another object of my invention to provide means for balancing the current distribution between the parallel circuits of the armature winding.

It is a further object of my invention to provide means for balancing the flux distribution between the magnetic paths of the armature core.

In accordance with my invention, I provide one or more auxiliary ring-wound windings which encircle the armature core and which are closed-circuited on themselves, and the coils of which are evenly distributed on the armature circumference. The resultant induction of the useful flux which acts upon the closed ring winding, when the machine is operating under the best circumstances, is equal to zero, and the ring winding carries no current. When there is an unequal distribution of the currents to be commutated at the different brush arms, the leakage fluxes of the commutating coils induce a resultant voltage in the ring winding and this voltage sets up a damping current in that winding which opposes the unequal distribution of the commutated currents. Furthermore, the ring winding will also oppose unequal current distribution in the individual parallel-connected circuits of the commutating windings.

Figure 1:
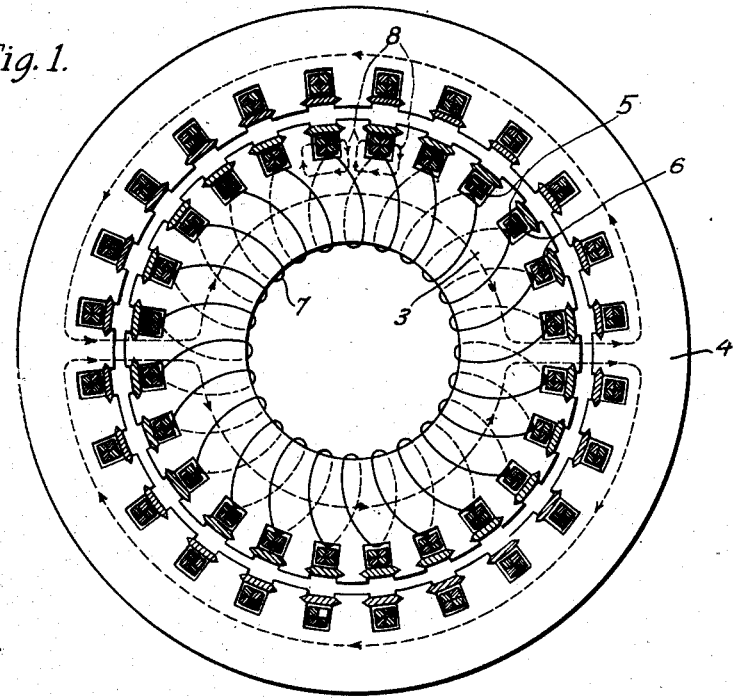
Figure 2:
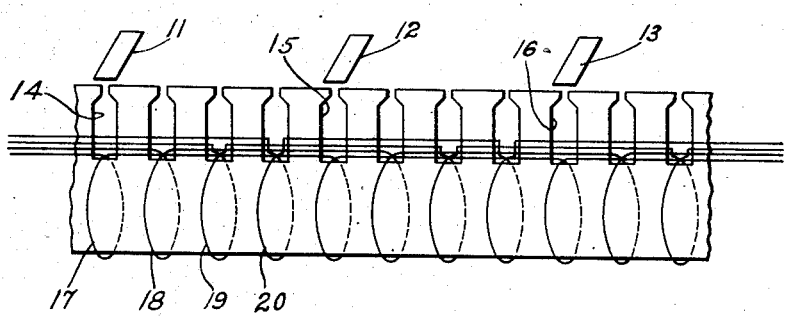

For a better understanding of my invention, reference may be had to the accompanying drawing, in which Figure 1 is a diagrammatic view of a dynamo-electric machine having a rotor embodying the ring winding of my invention, and Fig. 2 is a diagrammatic view of a rotor core, showing the utilization of a plurality of closed-ring windings, in accordance with my invention.

In Fig. 1 is illustrated a rotor core 3 within a stator member 4. The rotor core 3 is of the ring type but is also provided with peripheral coil slots 5 for disposition of a main commutating drum winding 6. In accordance with my invention, there is also provided, within the slots 5, a short-circuited, uniformly distributed ring winding 7, the coils of which encircle the active yoke iron of the rotor core, the external conductors of successive coils lying at the bottoms of consecutive slots. Since the ring winding interlinks with the slot leakage fluxes, indicated at 8, surrounding the separate slots, it provides a short circuit for the leakage flux, in which case, only the vectorial sum of all the slot leakage fluxes is effective for generating a short-circuit current. Thus, a current of substantial value is obtained when the distribution of the commutated currents at the individual brush arms becomes unequal.

It will be understood that my ring winding may be arranged in a plurality of ways; for instance, its outer conductors may lie in each second or third slot, or a plurality of turns may be disposed in a single slot, depending, of course, upon the design of the machine.

As shown in Fig. 1, the ring winding interlinks the leakage fluxes of all of the slots and thereby damps out the resultant slot leakage flux of all of the commutating coils. There is a possibility, in some designs, that this arrangement may prove somewhat imperfect, since not only is the reactance flux of the ring winding set up in the particular slots under commutation, where the effect is desired, but a reactance flux is set up around the slots which are not under commutation, and, consequently, the damping effect may be considerably weakened.

To overcome this disadvantage, an arrangement, such as shown in Fig. 2, may be employed wherein a plurality of ring windings are utilized, the coils of each ring winding being disposed in a slot group, the distance apart of each coil corresponding to the spacing of the brushes on the commutator. In this manner, there is only one active ring winding at any time, the conductors of which lie only in slots in which commutation is taking place, so that this ring winding is inductively affected only by the leakage fluxes of the slots which are under commutation. Accordingly, the damping current set up by the resultant of these commutation leakage fluxes will be substantially stronger and more effective.

In Fig. 2 is illustrated a development of the rotor core of a two-pole, three-phase commutator machine, the stator member and the main rotor windings being omitted. The three brushes 11, 12 and 13 of the machine are shown above the rotor core, separated from each other by 120°. The slots 14, 15 and 16 lying under the three brushes thus contain coils in which commutation is just taking place. To damp out unequal commutation currents, I provide as many independent closed-circuit ring windings as there are slots between the consecutive brushes. Thus, for a two-pole, 12-slot machine, there will be four closed-circuit ring-windings 17, 18, 19 and 20, and each individual ring winding will consist of three series-connected coils.

My invention also has application to machines without commutators, such as synchronous and induction machines, in order to prevent the occurrence of bearing currents. Bearing currents are known to occur when the useful flux varies in strength on the armature circumference by reason of the existence of joints in the stator core. My ring winding may be mounted on the active yoke arm, as already described, and may be utilized to damp out the fluctuations of this useful flux.

I claim as my invention:

1. In a dynamo-electric machine, an armature core having a drum-wound commutating winding and a closed auxiliary ring winding surrounding the active core, the individual turns of which are equally distributed around the circumference of the armature in such a way that the total resultant interlinkage of the active flux with the ring winding is zero.

2. In a dynamo-electric machine, an armature core having a drum-wound commutating winding and a plurality of closed auxiliary ring windings surrounding the active core and spaced equally around the core, the outer conductors thereof being disposed in the slots provided for the commutating winding, below the conductors of said commutating winding.

3. In a dynamo-electric machine, an armature core having a drum-wound commutating winding and a plurality of ring windings, the coils of each of the individual ring windings being disposed in slots, and the different ring-winding circuits being spaced on the armature circumference in accordance with the spacing of the commutator brushes.

4. Apparatus for securing equal distribution of current in armature windings of a dynamo-electric machine comprising an armature core having a drum-wound commutating winding and an uncommutating balancing winding comprising a closed-circuited winding having turns spaced apart a distance corresponding to the distance between brushes on the commutating winding.

5. In combination with a dynamo-electric machine having a drum-wound commutating winding on a slotted armature, means to secure equal distribution of current in the commutating winding which comprises a plurality of closed-circuited windings having the turns of the individual windings spaced apart so as to be in the slots with the coils of the commutating winding undergoing commutation, said closed-circuited winding carrying current only when the commutated currents are unbalanced.

In testimony whereof, I have hereunto subscribed my name this 6th day of November, 1928 at Berlin-Siemensstadt, Germany.

JAROSLAV KOZISEK.